F. N. Frost.
Curry Comb.
Nº 59,992. Patented Nov. 27, 1866.
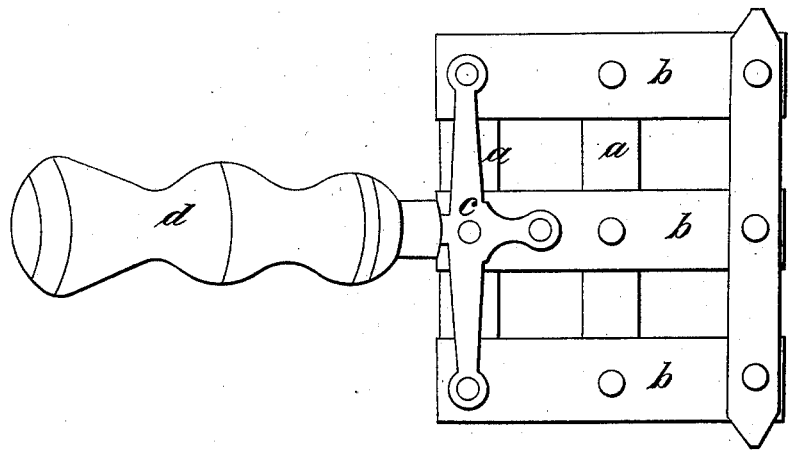
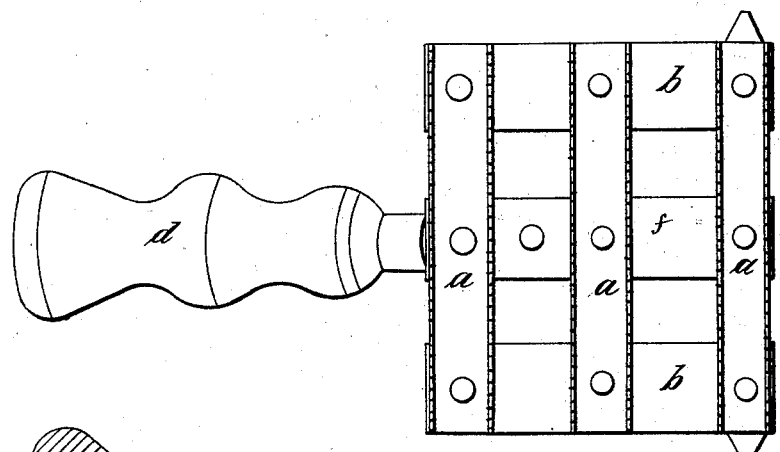
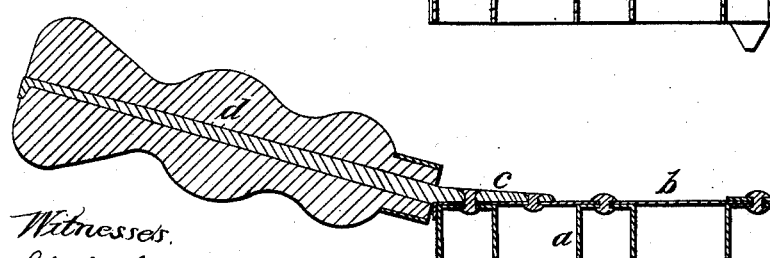
Witnesses.
Elisha Hatin
Jeremy W Blys
Inventor:
Francis N Frost

United States Patent Office.

IMPROVEMENT IN CURRY COMBS.

FRANCIS N. FROST, OF NEW BRITAIN, CONNECTICUT.

Letters Patent No. 59,992, dated November 27, 1866; antedated November 15, 1866.

SPECIFICATION.

TO ALL WHOM IT MAY CONCERN:

Be it known that I, FRANCIS N. FROST, of New Britain, county of Hartford, and State of Connecticut, have invented certain new and useful improvements in the manufacture of Curry Combs; and I do hereby declare that the same is described and represented in the following specification and drawings; and to enable others skilled in the art to make the same, I will proceed to describe its peculiarity; referring to the drawings, in which the same letters indicate like parts in each of the figures; the nature of which will be understood from the specification and drawings. The object desired to be attained thereby is to produce an animal comb, flexible and yielding in its disposition when applied to the animal's body or limbs, so that it may be used without producing that irritability usually produced by those now in use. The animal, like man, is sensitive to harshness and hard usage, and whatever is produced to benefit them is an advantage both to man and beast. It consists in making a curry comb of spring metal, as thin steel, instead of rigid metal, as iron, in the common way. In the accompanying drawings—

Figure 1 is a section view showing how the parts are put together.

Figure 2 is a face view.

Figure 3 is a back side view.

$a$ is a plate, the two edges of which are bent into about a right angle with the plate and parallel with each other, and provided with teeth on their edges. $b$ are flexible plates upon or to which the plates $a$ are arranged and secured. Those two plates are made of thin steel plate, instead of iron as in the usual way, for the purpose of producing a yielding disposition both to the back plate $b$ and teeth plate $a$. $c$ is a spider made of wrought or malleable iron, and secured to the back plates, $b$, and having a shank formed thereon for the handle, $d$. Thus, it will seem, that this comb is made in nearly all respects like those now in use, except that I substitute spring metal, as sheet steel, for the teeth plates $a$, and the back plates $b$, in combination with malleable or wrought-iron spider, $c$.

I believe I have thus shown the nature, construction, and advantage to be derived from this improvement, so as to enable others skilled to make the same therefrom.

What I claim, therefore, and desire to secure by Letters Patent, is—

In curry combs made of thin plate steel, as described, I claim the shank $c$, of malleable cast iron, and made in the form shown, so as to bear with equal force laterally across the entire breadth of the comb, substantially as described.

FRANCIS N. FROST.

Witnesses:
ELISHA HORTEN, Jr.,
JEREMY W. BLISS.